(12) United States Patent
Yang

(10) Patent No.: US 7,966,452 B2
(45) Date of Patent: Jun. 21, 2011

(54) CACHE ARCHITECTURE FOR A PROCESSING UNIT PROVIDING REDUCED POWER CONSUMPTION IN CACHE OPERATION

(75) Inventor: Qing Yang, Saunderstown, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 626 days.

(21) Appl. No.: 12/017,479

(22) Filed: Jan. 22, 2008

(65) Prior Publication Data

US 2008/0235455 A1    Sep. 25, 2008

Related U.S. Application Data

(63) Continuation of application No. PCT/US2006/029747, filed on Jul. 28, 2006.

(60) Provisional application No. 60/704,401, filed on Aug. 1, 2005.

(51) Int. Cl.
*G06F 12/00* (2006.01)
(52) U.S. Cl. ............... 711/118; 711/126; 711/E12.062
(58) Field of Classification Search .................. None
See application file for complete search history.

(56) References Cited

U.S. PATENT DOCUMENTS 5,249,282 A * 9/1993 Segers ................. 711/122
6,327,671 B1  12/2001 Menon

OTHER PUBLICATIONS

Hennessy J.L., Patterson D. A. Computer Architecture A Quantitative Approach. 2003, Third Edition, pp. 398-405.
Yang, Jun et al. "Energy Efficient Frequent Value Data Cache Design", Microarchitecture, 2002. (MICRO 35). Proceedings. 35th Annual IEEE/ACM International Symposium on Nov. 18-22, 2002. Picataway, NJ, USA, pp. 197-207.

* cited by examiner

*Primary Examiner* — Reginald G Bragdon
*Assistant Examiner* — Thanh D Vo
(74) *Attorney, Agent, or Firm* — Gauthier & Connors LLP

(57) ABSTRACT

A cache memory processing system is disclosed that is coupled to a main memory and a processing unit. The cache memory processing system includes an input, a low order bit data path, a high order bit data path and an output. The input is for receiving input data that includes at least one low order input bit and at least one high order input bit. The low order bit data path is for processing the at least one low order input bit and providing at least one low order output bit. The high order bit data path for processing the at least one high order input bit and providing at least one high order output bit. The high order bit data path includes at least one exclusive or gate. The output is for providing the at least one low order output bit and the at least one high order output bit.

14 Claims, 3 Drawing Sheets

CACHE ARCHITECTURE FOR A PROCESSING UNIT PROVIDING REDUCED POWER CONSUMPTION IN CACHE OPERATION

PRIORITY

This application is a continuation of International Patent Application No. PCT/US2006/029747, filed on Jul. 28, 2006 and claims priority to U.S. Provisional Patent Application 60/704,401, filed on Aug. 1, 2005, all of which are incorporated herein by reference in their entirety.

The present invention was made with U.S. Government support under Grant (Contract) Number, CCR-0312613, awarded by the National Science Foundation. The U.S. Government has certain rights to this invention.

BACKGROUND

Energy consumption of computer based equipment has been a general concern of computer designers. This is particularly true for mobile computing devices that are powered by batteries. More particularly, power consumption is a primary concern of conventional design of central processing units (CPUs). This is particularly true for consumer electronics devices such as MP3 players, MPEG players, cell phones, personal digital assistants (PDAs), laptop computers, and more. On-chip cache memory is the primary source of power consumption since up to 80% of on-chip transistors are devoted to cache memories. Existing technologies such as such as filter cache, frequent value data cache, reconfigurable cache, and data compressions seek to reduce the power consumption of cache memories.

Filter cache technologies employ an unusually small level 1 (L1) cache to perform most of caching activities while using a large level two (L2) cache to reduce penalty caused by high miss rate of such small L1 cache. The approach effectively trades performance for power consumption by filtering cache references. The frequent value data cache technique exploits the data locality property that a few values (4 to 128) are used very frequently by CPU. By storing these values in a register file indexed by a few encoded bits in the cache, they are able to reduce power consumption of cache memories greatly. Reconfigurable cache designs seek to adapt the cache configuration to different applications so that the cache can be better utilized. Data compressions in cache is aimed at reducing required cache size yet hold the same amount of data or enlarge cache capacity to hold large amount of data. Another approach reduces energy consumption through dynamic zero compression such that a large portion of cached data are zeros. Instead of accessing those zeros in its original form, they use one bit for each zero bytes. With only 2 additional FO4 gate delays for each read access, they are able to reduce total data cache energy by around 26% and instruction cache by around 10%.

Such existing technologies, however, are believed to provide only incremental improvement based on existing cache designs. There remains a need for a cache architecture that requires minimum power consumption.

SUMMARY OF THE INVENTION

In accordance with an embodiment, the invention provides a cache memory processing system coupled to a main memory and a processing unit. The cache memory processing system includes an input, a low order bit data path, a high order bit data path and an output. The input is for receiving input data that includes at least one low order input bit and at least one high order input bit. The low order bit data path is for processing the at least one low order input bit and providing at least one low order output bit. The high order bit data path is for processing the at least one high order input bit and providing at least one high order output bit. The high order bit data path includes at least one exclusive or gate. The output is for providing the at least one low order output bit and the at least one high order output bit.

BRIEF DESCRIPTION OF THE DRAWINGS

The following description may be further understood with reference to the accompanying drawings in which.

DETAILED DESCRIPTION OF THE ILLUSTRATED EMBODIMENTS

Figure 1:
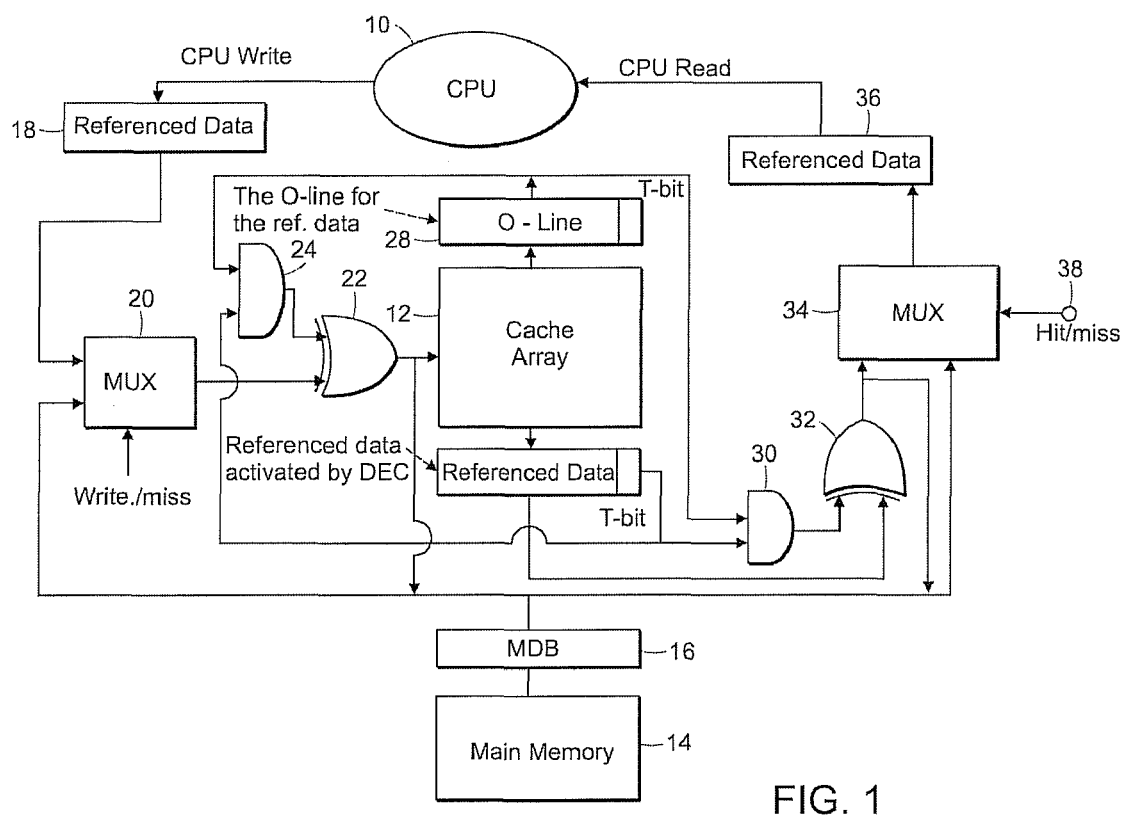
FIG. 1 shows an illustrative diagrammatic view of a circuit in accordance with an embodiment of the invention.

The present invention provides a cache architecture that caches slight variation of data with negligible overhead. By changing the form of data to be cached using a simple Exclusive-OR (XOR) function, dramatic power saving is possible because of the data locality property that exists in typical applications. Such locality property is more pronounced for multimedia data and consumer electronics applications. Preliminary evaluation shows that the architecture may reduce power consumption by as much as 80%. Such savings may be converted to consumer benefit of prolonged battery life for electronic devices.

In accordance with various embodiments, systems of the invention perform XOR function of a new cache data with a reference cache data upon each cache read and write. The reference cache data is one of the cached data items and is chosen dynamically at run lime. Because of data locality, such XOR computation results in a majority of bits in the data cache being zeros. These zeros are then encoded and indexed to reduce the number of data bits in the cache to Log N. Since XOR is combinational logic and does not pose additional delay when accessing memory, the computation will not increase the CPU cycle time. Moreover, the encoding and indexing can be done in parallel to other parts of a cache access. Besides the data cache, the tag array has a large portion of zero bits. These zero bits may similarly be encoded and indexed to minimize power consumption. Such a large amount of zeros make compression, filtering, or indexing much easier and manageable. As a result, the transformation creates great opportunities for minimizing power consumption of the on-chip cache memory. Existing technologies such as filtering, frequent value encoding, and compression may benefit greatly from our new cache design. Preliminary evaluation has shown that the new cache design reduces power consumption as much as 80%, implying the new architecture can potentially prolong battery life by 5 times as far as cache power consumption is concerned.

As a general example, consider an application for processing Video data. Digital videos are typically represented by at least 24 picture frames per second with each picture frame consisting of a two dimensional array of pixels. Each pixel is typically represented using a 3-4 bytes binary numbers. When a computer processes such picture frames, these binary numbers are read and written through the cache memory. Pixels that are physically close to each other are likely to differ by a few bits. Similarly, audio data exhibit the similar locality property. If 8 pixel words are XORed with one reference word in close proximity, 8 words with mostly zero bits will likely be obtained except for the few bits that actually change. By storing only the changed bits and encoding zeros, substantial power savings are obtained.

Power consumption analysis of systems of the invention, yield up to 87% power savings as compared to existing cache designs. Additional savings are possible with techniques such as dynamic zero compression. Such large power savings may benefit consumers greatly, providing, for example, more than triple the life of battery for mobile computing devices because 80% of on-chip transistors are used for cache memory. The overhead as result of the design is minimal with only a few XOR gates and Multiplexers, which is less than 1% of the cache logic. The design does not add any performance delay for cache accesses since the transformation is not part of critical path and is done in parallel to normal cache accesses.

In accordance with an embodiment, a system of the invention performs XOR function when a cache line is loaded into cache upon a miss or a write operation. The XOR function is performed between the newly loaded line and one of the original data lines (referred to as O-lines) in the each that is chosen dynamically at run time. Such XOR computation results in a majority of bits in the data cache being zeros, and these zeros are then encoded and indexed to reduce number of data bits in the cache. The encoding and indexing may be done in parallel to other parts of a cache access as evidence by our prior research on CAT (caching address tags) cache design. The tag array also has a large portion of zero bits, and these zero bits may similarly be encoded and indexed to minimize power consumption.

FIG. 1 shows a diagrammatic view of a logical structure of a system in accordance with an embodiment of the invention. The system includes a CPU 10, a cache memory 12, a main memory 14 and a memory disambiguation buffer (MDB) 16, as well as two groups of XOR and MUX gates to allow the data transformation. One group receives referenced data 18 from the CPU at a multiplexer 20 and receives data from the MDB 16 at the multiplexer 20. The output of the multiplexer 20 is provided to one input of an XOR gate 22. The second input to the XOR gate is provided by the output of an AND gate 24 that receives T-bit reference data 26 at one input and receives O-line data 28 at the other input from the cache 12. The other group receives the T-bit reference data 26 at a first input of an AND gate 30 and receives the T-bit-line reference data at a second input of the AND gate 30. The output of the AND gate 30 is provided to a first input of an XOR gate 32 and the other input of the XOR gate 32 is provided by the reference date 26. The output of the XOR gate 32 is provided to a multiplexer 34 that also receives input from the MBD 16, and the output of the multiplexer 34 provides referenced data 36 to the CPU. The multiplexer 34 also receives an input from a hit/miss signal as indicated at 38.

In the data array, there are two types of data: original data line referred to as O-Line and transformed data referred to as T-Line. The O-line data are stored in their original form and are used to perform XORs with transformed data. An O-line data can be determined dynamically at ran time to maximize zero bits or statically determined for simplicity of design. For the sake of discussion, let us consider the static O-lines that are uniformly scattered in the cache. Suppose the cache has 16 K lines and we chose to have 1 K O-lines. Then, there is one O-line for every 15 T-lines. One extra bit transformation bit (T-bit), in each line indicating whether it is an O-line or T-line. Upon a read reference to a line, this bit determines whether an XOR should be performed. If it is a T-line (T-bit=1), it is XORed with the first O-line with its transformation bit cleared above this referenced T-line. Otherwise, if it is an O-line, it is sent directly to CPU. The cache array has to be dual part cache to allow accesses to possible two lines in case the T-bit is 1. The detailed cache operations are as follows.

Read Hit: Upon a read hit, the cache access goes through the same process as the normal cache accesses. After decoding the index and associative search in a set two cache lines are loaded into the reference line buffer and O-line buffer respectively. The referenced cache line will be XORed or not depending on its T-bit as shown, in FIG. 1. Note that XORing with 0 gives its original value and a 0 T-bit effectively disable the XOR function. The only additional delay is one gate delay of the XOR gate array. As will be shown later, this delay can be completely eliminated in actual cache designs when a practical energy saving technique is incorporated.

Read Miss: When a read miss occurs, the data will come directly from the main memory. As shown in FIG. 1, the reference data goes to the CPU directly, while cache write operation is performed. Depending on whether the referenced cache line is an O-line or a T-line, the XOR function will be performed through the AND gates and the XOR gates and the result is written into the data cache memory.

Write Hit: Upon a write hit, the CPU will send the data to be written through the logic in FIG. 1. At the same time, the decoding process in the cache array will activate the addressed cache line. The T-bit of the activated cache line will again determine whether the XOR function is performed or not. Depending on whether write-through cache or write back cache, the original data will be written into the main memory through the same XO logic.

Write Miss: For write misses, the operation is an aggregation of operations for read miss and write hit. Depending on the cache coherence protocol used in the design, the write data may be performed in cache and to the main memory through a bus directory. Either way, original data are computed through the XOR logic.

An Example Implementation for Power Savings.

In a sequence of data being referenced by the CPU, it is very likely that the data differ in a few bits positions while other bit positions remain unchanged or change a little. Continuous functions and variables or multimedia data are examples of such data that usually change the low-order few bits in a sequence of data while high-order bits rarely change.

Figure 2:
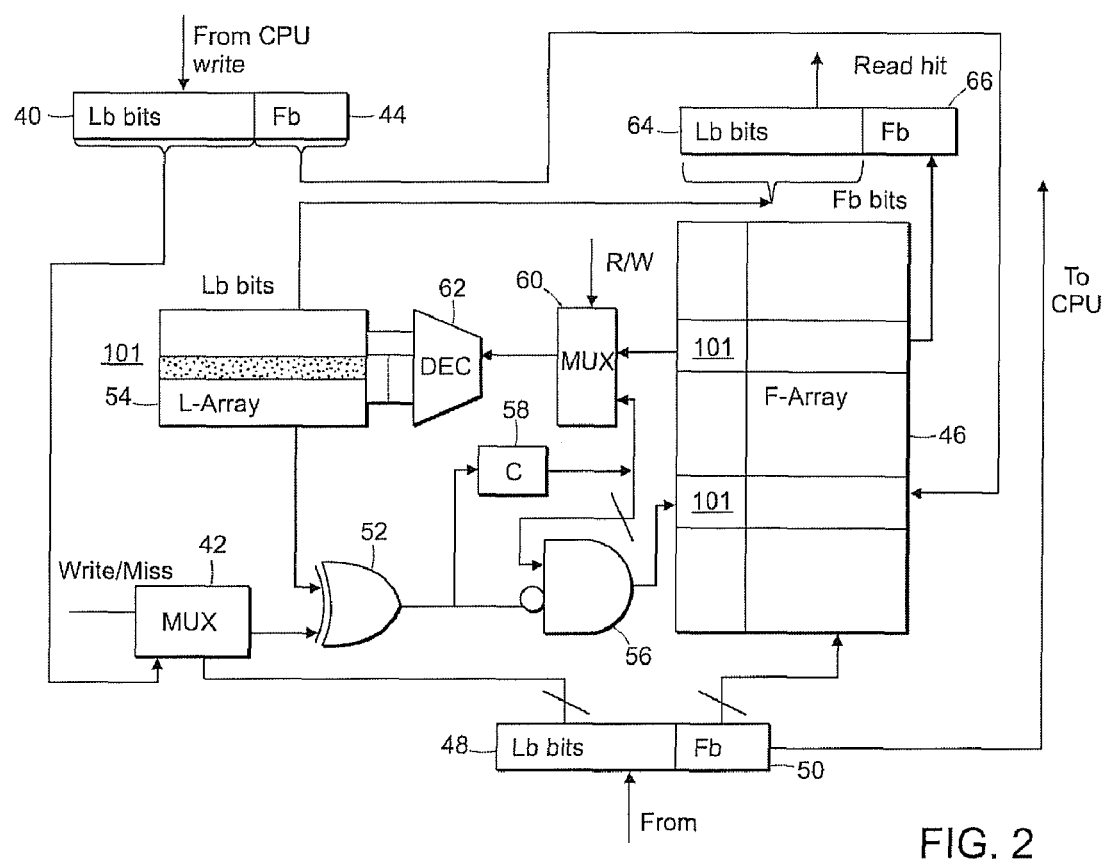
FIG. 2 shows an illustrative diagrammatic view of a circuit in accordance with another embodiment of the invention.

FIG. 2 shows a cache architecture in accordance with an embodiment of the invention. The normal data array of a cache memory is divided in two parts. One is called F-array to store frequently changed bits in a word/line. The other array is referred to as L-array to store less frequently changed bits of the word/line. The higher bits (less frequently changed) of data 40 from the CPU are provided to a multiplexer 42 while the lower bits (higher frequently changed) data 44 are provided to an F-array 46. Similarly, the higher bits (less frequently changed) of data 48 from memory are provided to the multiplexer 42 while the lower bits (higher frequently changed) data 50 are provided directly to the CPU.

The multiplexer 42 also receives write/miss input as shown, and the output of the multiplexer 42 is provided to an input of an XOR gate 52. The other input to the XOR gate 52 is provided by an L-array 54. The output of the XOR gate 52 is provided to an inverting input of an AND gate 56 as well as to a counter 58. The output of the counter 58 is provided to a multiplexer 60 as well as to the other input of the XOR gate 56. The multiplexer 60 also receives input from the F-array 46 as well as the read/write signal. The output of the multiplexer 60 is provided to a decoder 62 that is coupled to the L-array 54. The L-array 54 also provides an output to $L_b$ bit data 64 for a read hit, and the $F_b$ bit data 66 for a read hit is provided by the F-array 46.

Let $L_b$ be the width in terms of number of bits in the F-array and let $L_b$ be the width of the L-array. We expect $F_b$ to be much smaller than $L_b$. For example, $F_b$ could be 8 bits and $L_b$ could be 56 bits for a 64 bits word machine. Or alternatively we could have $F_b$ 16 bits and $L_b$ 112 bits for a 16 bytes cache line. The exact sizes of the two arrays should be tuned based on applications and benchmark studies. For the sake of discussion here, let us consider $F_b=8$ and $L_b=56$ bits, respectively. Since the two parts of each data item, frequently changed part and less frequently changed part, are decoupled, we cache data in their original form, i.e., no XOR transformation is done. The XOR function is mainly used to determine the same $L_b$ part commonly shared by many $F_b$ parts that change frequently. In this design, we assume that the frequently changed part is the low-order bits part of a word and the less frequently changed part is the high-order part of a word. The two arrays are associated by using pointers as shown in the figure. The detailed cache operations of the cache architecture are as follows.

Read Hit: Upon a CPU read operation and the referenced data item is found in the cache, the index field of the memory address goes through the normal cache decoder to activate one of the items in the F-Array. The pointer field of the activated data item in the F-Array will index one of the items in the L-Array. The referenced data is the concatenation of the two parts from the two arrays.

Read Miss/Write Miss: When a miss occurs, the data is loaded from the main memory. While the requested data goes to the CPU directly, write operations to the cache are done in the two arrays in parallel. First, the low-order bits are written into the F-Array using the memory address of the data item. The high order bits part will go to the L-Array. This high-order bits part is first XORed with the entry in the L-Array pointed by the counter C (a circular counter). If the result of the XOR is zero indicating that the high order-bits part of the referenced data item is the same as the L-Array entry pointed to by counter C, then the counter value is entered into the pointer field of the F-Array corresponding to the referenced data item. If the XOR result in a non-zero value, then this non-zero value triggers the counter to increment. The result of the counter points to the next line in the L-Array and another XOR operation is performed. The process continues until a zero result is obtained. The counter value then goes to the pointer field of the corresponding data item in the F-Array. We expect that more than 90% of memory references can find a match in the L-Array. If no zero is found after a complete round of counter values, the new high-order bits value is written into the first available space in the L-Array if there is available space. The corresponding counter value is written in the pointer field of the corresponding location in the F-Array. Otherwise if the L-Array is full, an L-Array miss occurs. The handling of such misses is discussed below.

Write Hit: If a write operation hits in the cache, the low-order bits are written in the F-Array in the same way as normal cache memories. The high-order bits part will have to go through the similar process as in a read miss as described above and as shown at the left hand side of FIG. 2. As soon as the output of the XOR gate is zero, the value of counter C is written into the pointer field of the written data item in the F-Array. If no zero is found after the counter loops back, the new value can be written into the L-Array if there is space available or an L-Array miss occurs similar to the read miss situation and will be handled in the same way. For write-through caches, the written data from the CPU goes directly to the main memory and bypass the XOR logic. For write-back caches, data concatenation between the two arrays needs to be performed upon write back operations in the similar way as read hits.

When L-Array is full and a new data to be written into the cache does not match any one of the data in the L-Array, an L-Array miss occurs. A replacement needs to be done to make room for the new data. Replacement algorithms such as LRU or MRU can be used. Care should be taken to handle such misses. The distinctive issue with the L-Array replacement is the association between L-Array and F-Array. One entry in the L-Array may be shared by many data items in the F-Array. Replacing an L-Array entry that is shared by many data items in the F-Array will suffer from performance penalty since all the data items associated with the replaced L-Array entry would have to be invalidated or replaced. Alternative replacement algorithms may be used such as the least counter value replacement algorithm. If the L-array size is tuned properly, the miss ratio of the L-Array may be controlled well less than 1%.

4. Analysis of Energy Savings

The following presents an approximate analysis of energy savings as result of the new cache architecture. Power consumptions in accessing cache memory are attributed primarily to driving word lines, bit lines, output drivers, decoders, and multiplexers. On-chip caches are usually implemented using SRAM that consume energy to keep state. Energy consumption, therefore, may be directly related to number of bits in the cache. With reference to FIG. 2 above, in addition to the data array and tag array of normal cache memory, we have extra XOR gates, a counter, and multiplexers. Let Cs be the size of the cache in terms of number of cache lines and Ws be the word size or line size. For simplicity, assume a cache line size to be same as word size. Let Ls be the number of dues in the L-Array and Lw be the width of each line in the L-Array in bits. Then the extra power consumption because of the cache of an embodiment of the invention may be approximately expressed as:

$$P_{extra} = \chi[Lw + 2Lw + \log(Ls)] + \sigma[\log(Ls) + Cs \log(Ls)], \quad (1)$$

where $\chi$ is an energy coefficient for combinational logic and $\sigma$ for sequential logic. Inside the first parenthesis, we have XOR gates, multiplexers, and the decoder for the L-Array. Inside the second parenthesis, the counter and the pointers in the F-Array are taken into account. The number of data bits in a normal cache is simply Cs*Ws while the number of cache bits in the CEO-cache is Cs*(Ws−Lw)+Ls*Ws.

Figure 3:
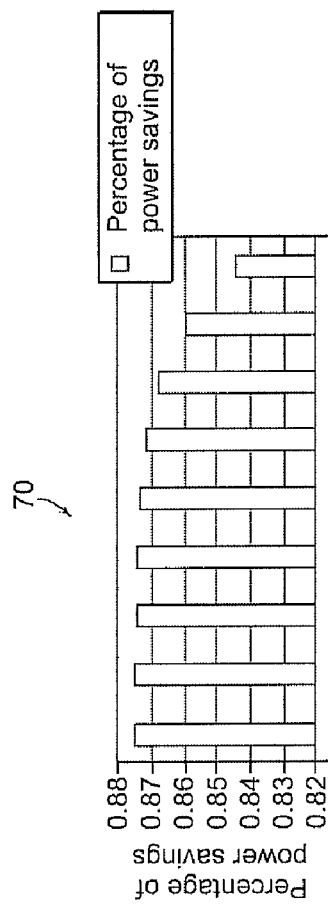
FIG. 3 shows a graphical representation of power savings versus array size for a system in accordance with an embodiment of the invention.

Based on this approximate analysis the percentage of power savings due to the cache design above with Fb=8 bits are plotted. FIG. 3 shows at 70 the percentage savings as a function of L-Array size for 64 bit word machines. Since combination logic consume less power than sequential logic. The values of $\chi$ and $\sigma$ are set to 0.5 and 0.9 respectively. The L-Array sizes are changed from 4 entries to 1 K entries for a 32 K words cache. Conventional research on tag arrays have shown that for this cache size, 16 or 32 entries for the L-Array can achieve the same cache hit ratio as the normal cache. As shown in this figure, over 84% of power savings are obtained for all the L-Array sizes considered. This saving is very significant because it implies that the normal cache memory would consume 5 times more power than our new cache design. Considering that 80% of on-chip transistors are used for cache memory, the overall power saving of the 32-entry L-Array XOR cache of the invention may be as high as 70%. This saving can be converted to consumers' benefit of prolonged battery life of 3.3 times, more than tripled.

Figure 4:
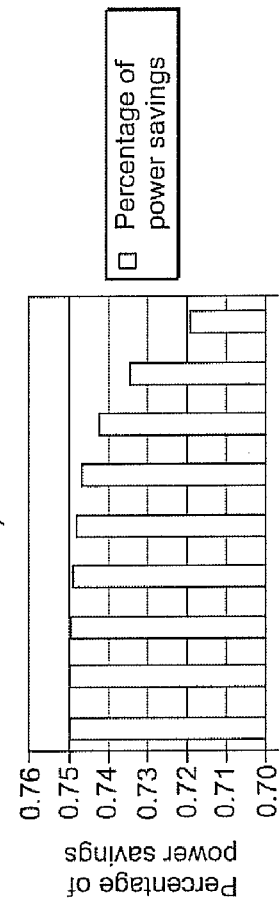
FIG. 4 shows a graphical representation of power savings versus array size for a system in accordance with another embodiment of the invention The drawings are shown for illustrative purposes only.

FIG. 4 shows at 72 similar results for 32 bits word machines. The percentage of power savings ranges from 72% to 75% for different L-Array sizes. These savings are also very significant.

In various embodiments, therefore, there is original data in the cache that is sparsely scattered across the data cache. This original data is used to carry out XOR transformations of other cached data. The original data lines, referred to O-lines, may be statically determined at design time for simplicity or dynamically determined at rum time to maximize number of 0 bits in cache. The majority zero bits in the cache allow easy compression, power reduction, indexing, and encoding etc. One possible implementation of a system of the invention is to use one zero bit to represent a zero byte realizing 8:1 reduction. A structure of caching frequently changed bits of data items in normal cache structure (data array) and caching the less frequently changed large portion of data items in a much smaller cache is provided. There is a many-to-one relationship between the frequently changed bit array and less frequently changed data array. Associations between the two arrays are done using pointers or associative search. Referenced data are provided by concatenations of selected item in both arrays. Power reduction are possible because of much smaller cache for large portion of a data item and smaller number of bits in the original array. Tag arrays show similar locality property with majority of high order-bits being the same. Similar power savings are possible by the same two part cache: low-order bit tag array and smaller high-order-bit tag array.

Those skilled in the art will appreciate that numerous modifications and variations may be made to the above disclosed embodiments without departing from the spirit and scope of the invention.

What is claimed is:

1. A cache memory processing system coupled to a main memory and a processing unit, said cache memory processing system comprising:
   an input for receiving input data that includes at least one low order input bit and at least one high order input bit;
   a low order bit data path including an array of higher frequently changing data bits, said low order bit path for processing said at least one low order input bit and providing at least one low order output bit;
   a high order bit data path including an array of lower frequently changing data bits, said high order bit path for processing said at least one high order input bit and providing at least one high order output bit, said high order bit data path including at least one exclusive OR gate; and
   an output for providing at the least one low order output bit and the at least one high order output bit.

2. The cache memory processing system as claimed in claim 1, wherein said high order bit data path includes a multiplexer.

3. The cache memory processing system as claimed in claim 1, wherein said input is coupled to the central processing unit and the output is coupled to the main memory.

4. The cache memory processing system as claimed in claim 1, wherein said input is coupled to the main memory and the output is coupled to the central processing unit.

5. The cache memory processing system as claimed in claim 1, wherein said system includes a first high order bit data path from the processing unit to the main memory, and a second high order bit data path from the main memory to the processing system.

6. The cache memory processing system as claimed in claim 5, wherein said first high order bit data path includes a first exclusive OR gate and a first multiplexer, and said second high order bit data path includes a second exclusive OR gate and a second multiplexer.

7. A cache memory processing system coupled to a main memory and a processing unit, said cache memory processing system comprising:
   an input for receiving input data that includes at least 32 bits, at least two of which are low order input bits and at least two of which are high order input bit;
   a low order bit data path including an array of higher frequently changing data bits, said low order bit path for processing said at least two low order input bits and providing at least two low order output bits;
   a high order bit data path including an array of lower frequently changing data bits, said high order bit path for processing said at least two high order input bits and providing at least two high order output bits, said high order bit data path including at least one exclusive OR gate for performing an exclusive OR function on said at least one high order input bit and data from an array of data bits; and
   an output for providing at the least one low order output bits and the at least one high order output bits to provide output data including at least 32 bits.

8. The cache memory processing system as claimed in claim 7, wherein said high order bit data path includes a multiplexer.

9. The cache memory processing system as claimed in claim 7, wherein said input is coupled to the central processing unit and the output is coupled to the main memory.

10. The cache memory processing system as claimed in claim 7, wherein said input is coupled to the main memory and the output is coupled to the central processing unit.

11. The cache memory processing system as claimed in claim 7, wherein said system includes a first high order bit data path from the processing unit to the main memory, and a second high order bit data path from the main memory to the processing system.

12. The cache memory processing system as claimed in claim 11, wherein said first high order bit data path includes a first exclusive OR gate and a first multiplexer, and said second high order bit data path includes a second exclusive OR gate and a second multiplexer.

13. A method of processing cache memory in a cache memory processing system coupled to a main memory and a processing unit, said method comprising the steps of:
   receiving input data that includes at least one low order input bit and at least one high order input bit;
   processing said at least one low order input bit and providing at least one low order output bit using a low order bit data path, said low order data bit path including an array of higher frequently changing data bits;
   processing said at least one high order input bit and providing at least one high order output bit using a high order bit data path, said high order bit data path including an array of lower frequently changing data bits and at least one exclusive OR gate; and
   providing at the least one low order output bit and the at least one high order output bit.

14. The method as claimed in claim 13, wherein said high order bit data path includes a multiplexer.

* * * * *